(12) United States Patent
Weller et al.

(10) Patent No.: US 9,402,342 B2
(45) Date of Patent: Aug. 2, 2016

(54) SYSTEM FOR DRIVING A SEED METER VIA A FLEXIBLE SHAFT

(71) Applicant: CNH Industrial America LLC, New Holland, PA (US)

(72) Inventors: Monte Weller, Frankfort, IL (US); David Flamme, Winfield, IL (US); Scott Long, Plainfield, IL (US); Marvin Prickel, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/350,934

(22) PCT Filed: Oct. 11, 2012

(86) PCT No.: PCT/IB2012/055527
§ 371 (c)(1),
(2) Date: Apr. 10, 2014

(87) PCT Pub. No.: WO2013/054295
PCT Pub. Date: Apr. 18, 2013

(65) Prior Publication Data
US 2014/0284162 A1    Sep. 25, 2014

Related U.S. Application Data

(60) Provisional application No. 61/547,373, filed on Oct. 14, 2011.

(51) Int. Cl.
*A01C 19/00* (2006.01)

(52) U.S. Cl.
CPC ........................... *A01C 19/00* (2013.01)

(58) Field of Classification Search
CPC ........................................... A01C 19/00
USPC ......... 111/200, 184, 183, 177, 173, 921, 922;
192/70.19, 70.16, 70.11, 66.1, 30 R;
74/13; 172/105
See application file for complete search history.

(56) References Cited

U.S. PATENT DOCUMENTS

| 7,571,688 | B1 | 8/2009 | Friestad et al. | |
| 7,671,688 | B2 * | 3/2010 | Marques | ......................... 331/44 |
| 2009/0090283 | A1 * | 4/2009 | Riewerts | ....................... 111/184 |

FOREIGN PATENT DOCUMENTS

| GB | 000899733 | A * | 6/1962 |
| SU | 1289399 | | 2/1987 |

OTHER PUBLICATIONS

Kazakhstan Office Action Mailed Jul. 28, 2015.
Russian Office Action Mailed Aug. 12, 2015.

\* cited by examiner

*Primary Examiner* — Christopher J Novosad
(74) *Attorney, Agent, or Firm* — Rebecca L. Henkel

(57) ABSTRACT

A seed meter drive system includes a clutch having a toolless fastener configured to selectively couple the clutch to a downstream component. The clutch is configured to receive a rotational input via a flexible drive shaft, and to drive the downstream component in rotation while the clutch is engaged.

12 Claims, 4 Drawing Sheets

SYSTEM FOR DRIVING A SEED METER VIA A FLEXIBLE SHAFT

CROSS REFERENCE TO RELATED APPLICATION

This application is the US National Stage filing of International Application Serial No. PCT/ PCT/IB2012/05552, entitled "SYSTEM FOR DRIVING A SEED METER VIA A FLEXIBLE SHAFT", filed Oct. 12, 2012, which claims priority from and the benefit of U.S. Provisional Application Ser. No. 61/547,373, entitled "SYSTEM FOR DRIVING A SEED METER VIA A FLEXIBLE SHAFT", filed Oct. 14, 2011, both of which are hereby incorporated by reference in its entirety.

BACKGROUND

The invention relates generally to ground working equipment, such as agricultural equipment, and more specifically, to a system for driving a seed meter via a flexible shaft.

Generally, seeding implements are towed behind a tractor or other work vehicle via a hitch assembly secured to a rigid frame of a planter or seeder. These seeding implements typically include one or more ground engaging tools or openers that form a seeding path for seed deposition into the soil. The openers are used to break the soil to enable seed deposition. After the seeds are deposited, each opener is followed by a packer wheel that packs the soil on top of the deposited seeds.

Certain seeding implements include multiple row units configured to deposit the seeds within the soil. In certain configurations, each row unit includes a metering system configured to deliver seeds to a seed tube which, in turn, deposits the seeds into the soil. By operating the metering system at a particular speed, a desired seed spacing may be established as the implement traverses a field. In certain configurations, each metering system is driven to rotate by a flexible drive shaft. For example, certain seeding implements include a rigid drive shaft oriented substantially perpendicular to the direction of travel. Multiple primary gearboxes are rotatably coupled to the rigid drive shaft, and configured to convert drive shaft rotation into rotation of a respective flexible shaft. Each flexible shaft, in turn, is coupled to a secondary gearbox configured to drive the metering system of a respective row unit in rotation. Consequently, rotation of the rigid drive shaft induces each metering system to rotate via rotation of a respective flexible shaft.

Certain secondary gearboxes include an integrated clutch configured to selectively interrupt rotation of the metering system. In such configurations, the gearbox housing includes a first receptacle configured to receive an end of the flexible shaft, and a second receptacle configured to receive an electrical conductor. The electrical conductor is configured to convey a signal to the clutch, instructing the clutch to engage or disengage. In certain configurations, the metering system is attached to a hopper that may be periodically removed for maintenance operations (e.g., emptying, cleaning, etc.). Unfortunately, the process of disconnecting the flexible shaft and the electrical conductor prior to removing the metering system may be time-consuming, thereby delaying seeding operations. In addition, if the operator neglects to remove the electrical conductor prior to removal of the metering system, the electrical conductor and/or the fastener coupling the electrical conductor to the gearbox housing may experience excessive wear.

BRIEF DESCRIPTION

In one embodiment, a seed meter drive system includes a clutch having a toolless fastener configured to selectively couple the clutch to a downstream component. The clutch is configured to receive a rotational input via a flexible drive shaft, and to drive the downstream component in rotation while the clutch is engaged.

In another embodiment, a seed meter drive system includes a flexible drive shaft, and a clutch configured to receive a first rotational input from the flexible drive shaft. The clutch includes a toolless fastener configured to selectively couple the clutch to a downstream component. The seed meter drive system also includes a gearbox configured to receive a second rotational input from the clutch while the clutch is engaged. The gearbox is also configured to drive a seed meter in rotation.

In a further embodiment, a seed meter drive system includes a flexible drive shaft, and a clutch including a toolless fastener configured to selectively couple the clutch to a downstream component. The clutch is configured to receive a rotational input from the flexible drive shaft, and to drive the downstream component in rotation while the clutch is engaged. The seed meter drive system also includes an electrical conductor configured to engage the clutch upstream of the toolless fastener. The electrical conductor is configured to convey a signal to the clutch that instructs the clutch to engage or disengage. In this configuration, the clutch and the electrical conductor are removable from the downstream component by only uncoupling the toolless fastener.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
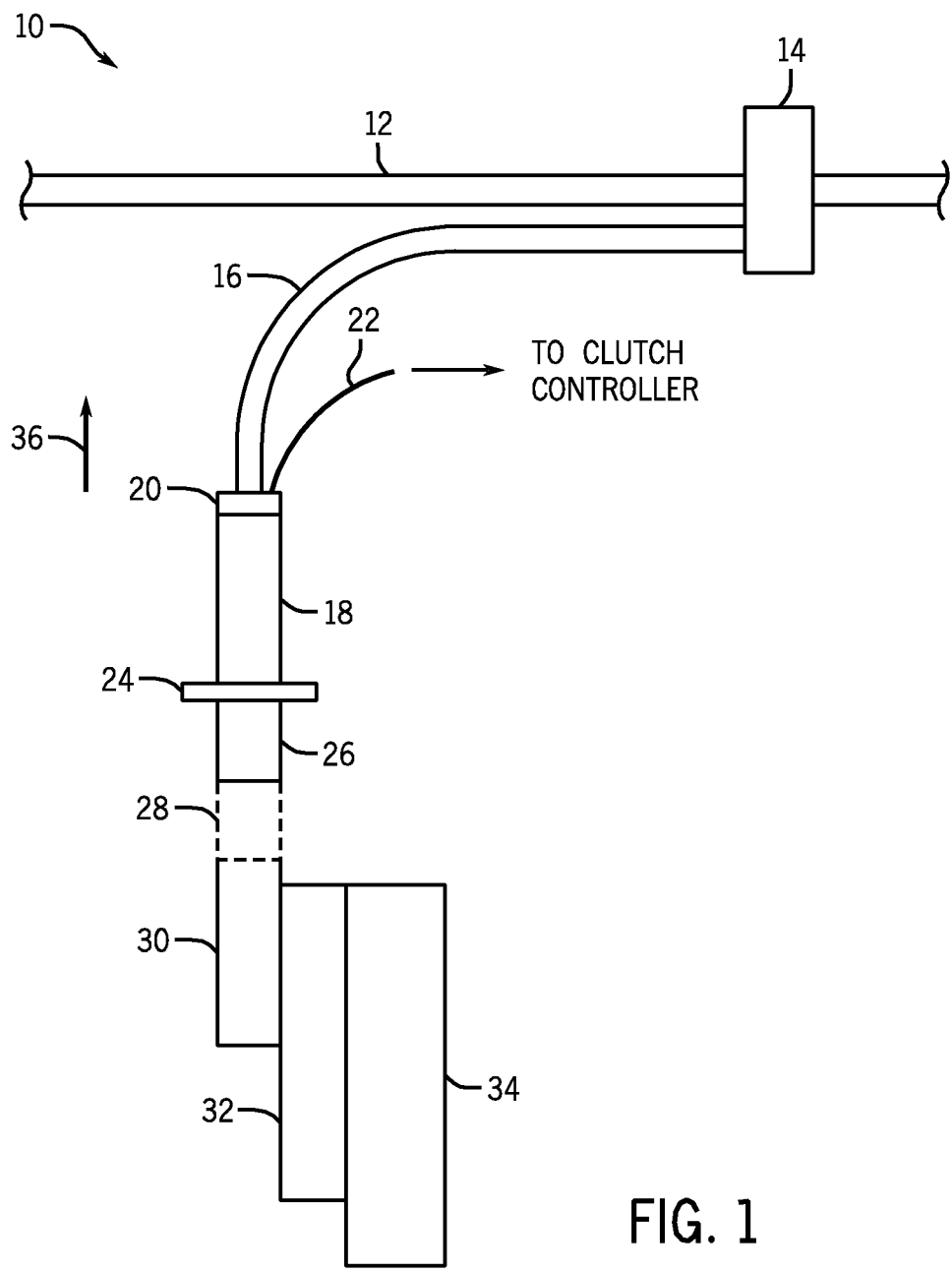
FIG. 1 is a schematic diagram of an embodiment of a seed meter drive system 10 including a clutch having an toolless fastener configured to selectively couple the clutch to a downstream component.

FIG. 1 is a schematic diagram of an embodiment of a seed meter drive system 10 including a clutch having an toolless fastener configured to selectively couple the clutch to a downstream component. In the illustrated embodiment, the seed meter drive system 10 includes a drive shaft 12 driven to rotate by an external power source, such as an electric or hydraulic motor, or a drive wheel engaged with the soil surface and configured to rotate as the implement traverses a field. In certain embodiments, the drive shaft 12 extends along a seeding implement substantially perpendicular to the direction of travel. As illustrated, a first gearbox 14 is coupled to the drive shaft 12. For example, the drive shaft 12 may have a substantially hexagon cross-section, and the gearbox 14 may have a corresponding input shaped to receive the hexagon drive shaft 12. In this configuration, the drive shaft 12 is coupled to at least one gear within the gearbox, such that rotation of the drive shaft 12 induces gears within the gearbox 14 to rotate.

The seed meter drive system 10 also includes a flexible drive shaft 16 coupled to the gearbox 14. As will be appreciated, the flexible drive shaft 16 may include a flexible drive cable surrounded by a flexible outer layer. The flexible drive cable is configured to rotate relative to the flexible outer layer, thereby transferring torque from a first shaft end to a second shaft end. In the illustrated embodiment, the first shaft end is coupled to the gearbox 14 such that rotation of gears within the gearbox drives the flexible drive shaft 16 to rotate. Furthermore, the second shaft end is coupled to a clutch 18, such that rotation of the flexible drive shaft 16 drives the clutch 18 to rotate. In the illustrated embodiment, the flexible drive shaft 16 is coupled to the clutch 18 via a tool-actuated fastener 20. In this configuration, the flexible drive shaft 16 may be uncoupled from the clutch 18 by rotating a tool (e.g., wrench) circumferentially about the fastener 20.

In the illustrated embodiment, the clutch 18 includes an actuator configured to selectively engage and disengage the clutch based on an input signal from an electrical conductor 22. For example, the actuator may include a solenoid configured to selectively disengage clutch discs upon application of electrical power. In the illustrated embodiment, the electrical conductor 22 is coupled to the clutch 18 via the tool-actuated fastener 20. For example, the tool-actuated fastener 20 may include a first opening configured to facilitate passage of a drive shaft end into the clutch 18, and a second opening configured to facilitate passage of the electrical conductor 22 into the clutch 18. Consequently, the flexible drive shaft 16 and the electrical conductor 22 may be coupled to the clutch 18 via a single fastener, thereby facilitating installation and removal of the clutch 18. Alternatively, the clutch 18 may be integrated with the flexible drive shaft 16. In such embodiments, the electrical conductor 22 may also be integrated with the flexible drive shaft 16, or directly connected to the clutch 18.

In the illustrated embodiment, the clutch 18 includes a toolless fastener 24 configured to selectively couple the clutch 18 to a downstream component (e.g., second gearbox, torque limiter, manual disconnect, etc.). The toolless fastener 24 is configured to enable an operator to install and remove the clutch 18 by hand (i.e., without the use of tools). Consequently, the downstream component may be readily removed for cleaning and/or maintenance operations. In the illustrated embodiment, the toolless fastener 24 is configured to support the clutch 18 on the downstream component. However, it should be appreciated that alternative embodiments may include brackets configured to support the clutch 18, thereby reducing the load on the fastener 24.

In the illustrated embodiment, the toolless fastener 24 is coupled to a manual disconnect 26 configured to rotatably uncouple the clutch 18 from downstream components. In certain embodiments, the manual disconnect 26 may be coupled to a torque limiter configured to limit the torque applied to the downstream components 28. However, it should be appreciated that the torque limiter 28 may be omitted in certain embodiments. In the illustrated embodiment, the torque limiter 28 is coupled to a second gearbox 30 configured to drive a seed meter 32 in rotation. As the seed meter 32 rotates, seeds from a hopper 34 are conveyed to a seed tube for deposition into the soil. Consequently, seed deposition may be controlled by selectively engaging and disengaging rotation of the seed meter 32.

While the clutch 18 is engaged, rotation of the flexible shaft 16 drives the seed meter 32 to rotate. However, when the clutch 18 is disengaged, the flexible shaft 16 is rotatably uncoupled from the seed meter 32, thereby stopping seed deposition into the soil. For example, as the implement traverses a field, the seed meter 12 dispenses seeds for disposition within the soil. However, when the implement is turned at a headland, the operator or an automated system may instruct the clutch 18 to disengage, thereby stopping the flow of seeds. Once the implement is aligned with the next row, the clutch 18 may be reengaged to facilitate seed deposition within the soil. Such a configuration may increase seeding efficiency by limiting seed disposition to desired regions of a field.

Furthermore, to disable certain seed meters 32 for extended time periods, the flexible drive shaft 16 may be rotatably uncoupled from the seed meter 32 via the manual disconnect. Furthermore, the torque limiter 28 may substantially reduce wear on the seed meter 32 by limiting the applied torque. In the illustrated embodiment, the manual disconnect 26 and the torque limiter 18 are disposed within separate housings. However, it should be appreciated that the manual disconnect 26 and the torque limiter 28 may be contained within a single housing in alternative embodiments. Furthermore, as discussed in detail below, the manual disconnect 26 and the torque limiter 28 may be integrated within the gearbox 30 in alternative embodiments.

In the illustrated embodiment, the clutch 18 may be readily disconnected from the manual disconnect 26 via disengagement of the toolless fastener 24. For example, to remove the downstream components for cleaning or maintenance operations, the toolless fastener 24 may be disengaged, and the clutch 18 may be translated in the direction 36. As a result, the clutch 18 may be physically disengaged from the gearbox 30 via a single operation. Consequently, the duration associated with removing the downstream components may be substantially reduced, as compared to configurations in which the clutch is integrated with the gearbox, and the flexible shaft and the electrical conductor are separately disengaged prior to removal of the downstream components. In addition, because the electrical conductor 22 is coupled to the removable clutch 18, the downstream components (e.g., gearbox 30, seed meter 32, hopper 34, etc.) may be removed without uncoupling the electrical conductor 22. Moreover, because the first gearbox 14 is laterally offset from the second gearbox 32, the force sufficient to remove the clutch 18 may be substantially lower than configurations in which the gearboxes are laterally aligned.

Figure 2:
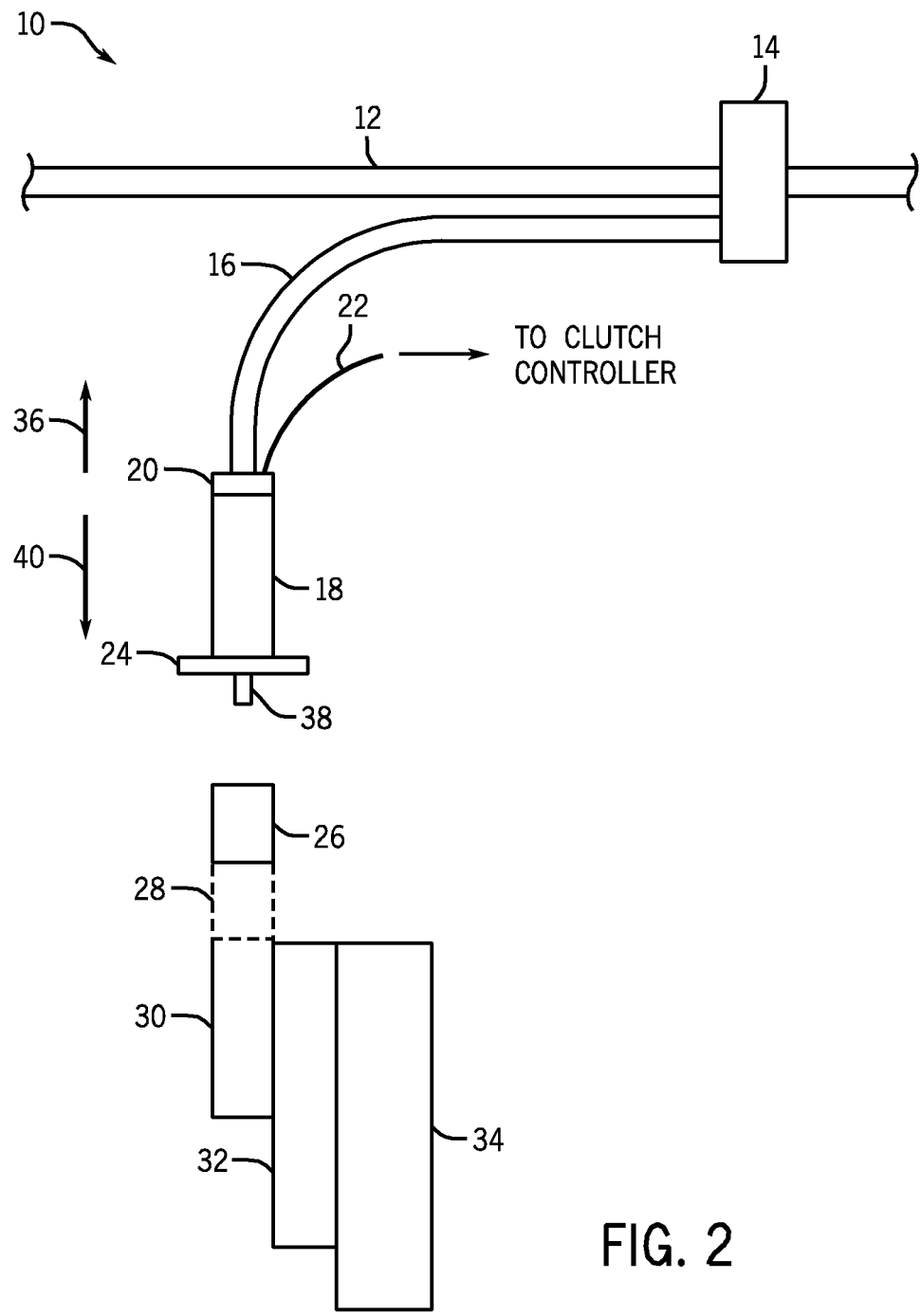
FIG. 2 is a schematic diagram of the seed meter drive system of FIG. 1, in which the clutch is uncoupled from the downstream component.

FIG. 2 is a schematic diagram of the seed meter drive system 10 of FIG. 1, in which the clutch 18 is uncoupled from the downstream component. As illustrated, the clutch 18 is offset from the manual disconnect 26 along the direction 36, thereby exposing a shaft end 38 of the clutch. As previously discussed, because the clutch 18 is coupled to the manual disconnect 26 by a single fastener 24, the downstream components may be readily removed for cleaning and/or maintenance operations. In addition, to reengage the flexible drive shaft 16, the downstream components are installed within the implement, and the clutch 18 is translated in the direction 40 until the toolless fastener 24 engages a corresponding interface on the manual disconnect 26. The fastener 24 is then engaged by hand to secure the clutch 18 to the manual disconnect 26, thereby coupling the clutch 18 to the gearbox 30.

Figure 3:
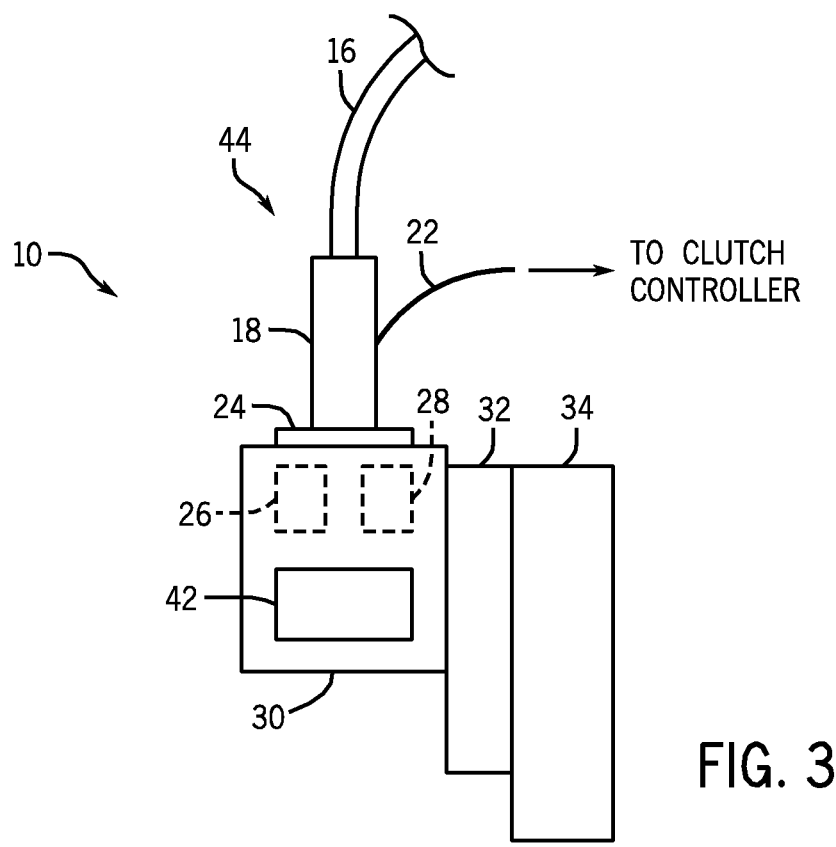
FIG. 3 is a schematic diagram of an alternative embodiment of a seed meter drive system, including a gearbox having an integrated manual disconnect and/or a torque limiter.

FIG. 3 is a schematic diagram of an alternative embodiment of a seed meter drive system 10, including a gearbox 30 having an integrated manual disconnect 26 and/or a torque limiter 28. In the illustrated embodiment, the manual disconnect 26 and the torque limiter 28 are rotatable coupled to a gear assembly 42 within the gearbox 30. The gear assembly 42 is configured to receive a rotational input from the clutch 18, and to drive the seed meter 32 in rotation. As illustrated, the clutch 18 is directly coupled to the gearbox 30 by the toolless fastener 24. While the illustrated toolless fastener 24 is configured to support the clutch 18 on the gearbox 30, it should be appreciated that alternative embodiments may include brackets to support the clutch 18. Similar to the embodiment described above with reference to FIGS. 1 and 2, the clutch 18 may be disconnected from the gearbox 30 by disconnecting a single fastener 24, thereby facilitating installation and removal of the downstream components (e.g., gearbox 30, seed meter 32 and hopper 34). Furthermore, the illustrated embodiment includes a drive assembly 44 in which the clutch 18 is integrated within the flexible drive shaft 16. In addition, the illustrated seed meter drive system 10 includes an electrical conductor 22 directly coupled to the clutch 18.

Figure 4:
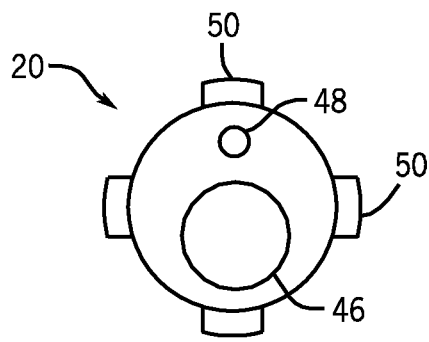
FIG. 4 is a front view an exemplary tool-actuated fastener configured to couple a flexible drive shaft to a clutch.

FIG. 4 is a front view an exemplary tool-actuated fastener 20 configured to couple the flexible drive shaft 16 to the clutch 18. As illustrated, the tool-actuated fastener 20 includes a first opening 46 configured to facilitate passage of a drive shaft end into the clutch 18, and a second opening 48 configured to facilitate passage of the electrical conductor 22 into the clutch 18. The tool-actuated fastener 20 also includes protrusions 50 configured to engage corresponding recesses within a tool, such as a wrench, to facilitate rotation of the fastener 20. In this configuration, the flexible drive shaft 16 and the electrical conductor 22 may be coupled to the clutch 18 via a single fastener 20, thereby facilitating installation and removal of the clutch 18.

In alternative embodiments, a quick-connector may be employed to couple the flexible drive shaft 16 to the clutch 18. In such embodiments, the quick-connector contains both the electrical connections for the electrical conductor, and the mechanical connections for the flexible drive shaft. In certain embodiments, the electrical connector may be integral with the outer layer of the flexible drive shaft 16. Prior to coupling the quick-connector to the clutch 18, the drive shaft end is aligned with a receptacle in the clutch, and the electrical connector is aligned with a corresponding connector on the clutch. Accordingly, the drive shaft end engages the receptacle, and the electrical connectors engage one another as the quick-connector couples the flexible drive shaft 16 to the clutch 18. As will be appreciated, the quick-connector and the tool-actuated fastener 20 may be suitable for coupling a flexible drive shaft to a gearbox having an integral clutch.

Figure 5:
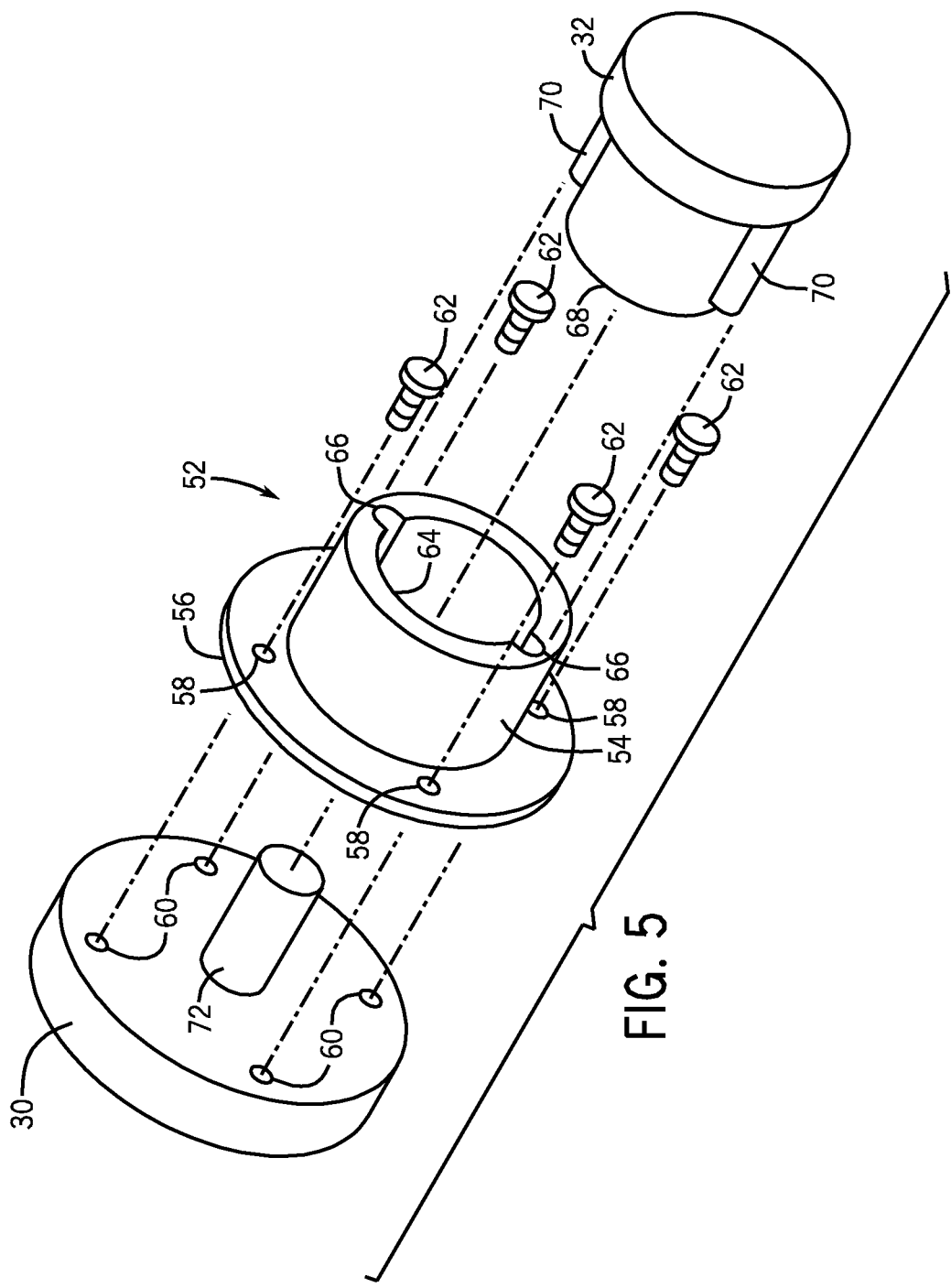
FIG. 5 is an exploded view of an embodiment of an anti-rotation device configured to secure a gearbox to a seed meter.

FIG. 5 is an exploded view of an embodiment of an anti-rotation device 52 configured to secure the gearbox 30 to the seed meter 32. In the illustrated embodiment, the anti-rotation device 52 includes a sleeve 54 configured to interface with the seed meter 32, and a flange 56 configured to interface with the gearbox 30. The flange 56 includes multiple openings 58, and the gearbox 30 includes corresponding openings 60. The openings 58 and 60 are configured to receive respective fasteners 62 to secure the anti-rotation device 52 to the gearbox 30. For example, in certain embodiments, the shaft of each fastener 62 may be threaded. In such embodiments, the shaft may pass through an opening 58 in the flange 56, and engage a threaded opening 60 in the gearbox 30, thereby securing the anti-rotation device 52 to the gearbox 30.

While the illustrated embodiment includes four fasteners 62 and a corresponding number of openings 58 and 60, it should be appreciated that alternative embodiments may include more or fewer fasteners/openings. For example, certain embodiments may include 1, 2, 3, 4, 5, 6, 7, 8, or more fasteners and a corresponding number of openings. Moreover, while threaded fasteners are described above, it should be appreciated that alternative embodiments may employ other fastener configurations, such as pins or bolts. In further embodiments, the anti-rotation device 52 may be secured to the gearbox 30 by a bonded connection, such as a welded connection or an adhesive connection, for example.

The sleeve 54 of the anti-rotation device 52 includes a passage 64 and two recesses 66 disposed within an inner wall of the passage 64. The recesses 66 extend along a longitudinal axis of the passage 64, and are positioned approximately 180 degrees apart along the circumference of the passage 64. The passage 64 is configured to receive an extension 68 of the seed meter 32, and each recess 66 is configured to receive a respective protrusion 70 extending radially outward from the extension 68. Once the extension 68 is inserted into the passage 64, contact between the protrusions 70 and the recesses 66 blocks rotation of the seed meter 32 relative to the anti-rotation device 52. Accordingly, when torque is applied to internal components of the seed meter 32 (e.g., meter roller) by a shaft 72 of the gearbox 30, rotation of the seed meter 32 relative to the gearbox 30 is blocked. For example, rotation of the shaft 72 may urge the seed meter 32 to rotate. However, as previously discussed, contact between the protrusions 70 and the recesses 66 blocks rotation of the seed meter 32 relative to the anti-rotation device 52. Furthermore, contact between the fasteners 62 and the openings 58 and 60 blocks rotation of the anti-rotation device 52 relative to the gearbox 30. Therefore, the orientation of the seed meter 32 relative to the gearbox 30 may be substantially maintained during operation of the seed meter 32.

While the illustrated embodiment includes two protrusions 70 and a corresponding number of recesses 66, it should be appreciated that more or fewer protrusions/recesses may be employed in alternative embodiments. For example, in certain embodiments, the extension 68 may include 1, 2, 3, 4, 5, 6, or more protrusions 70, and the passage 64 may include a corresponding number of recesses 66. In further embodiments, the cross-section of the extension 68 may be shaped to block rotation of the seed meter 32 relative to the anti-rotation device 52. For example, in certain embodiments, the cross-section of the extension 68 may be polygonal, star-shaped (e.g., 5-pointed, 6-pointed, etc.), or elliptical, among other shapes, to block rotation of the seed meter 32 relative to the anti-rotation device 52. Furthermore, while the illustrated embodiment includes an anti-rotation device to secure the seed meter 32 to the gearbox 30, it should be appreciated that in alternative embodiments, the seed meter 32 may be directly coupled to the gearbox (e.g., by multiple fasteners).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A seed meter drive system, comprising:
   a clutch comprising a toolless fastener that in operation selectively couples a housing of the clutch to a housing of a downstream component, wherein the clutch in operation receives a rotational input via a flexible drive shaft, and the clutch in operation drives a rotatable element of the downstream component in rotation while the housing of the clutch is coupled to the housing of the downstream component and the clutch is engaged.

2. The system of claim 1, wherein the downstream component comprises a gearbox that in operation drives a seed meter in rotation.

3. The system of claim 2, wherein the gearbox comprises an integrated manual disconnect that in operation rotatably uncouples the clutch from the seed meter, or an integrated torque limiter that in operation limits torque applied to the seed meter.

4. The system of claim 1, wherein the downstream component comprises a torque limiter that in operation limits torque applied to a gearbox, or a manual disconnect that in operation rotatably uncouples the clutch from the gearbox.

5. The system of claim 1, comprising an electrical conductor coupled to the clutch upstream of the toolless fastener, wherein the electrical conductor in operation conveys a signal to the clutch that instructs the clutch to engage or disengage.

6. The system of claim 1, comprising a tool-actuated fastener that in operation couples the clutch to the flexible drive shaft.

7. The system of claim 6, wherein the tool-actuated fastener comprises a first opening that facilitates passage of a drive shaft end into the housing of the clutch, and a second opening that facilitates passage of an electrical conductor into the housing of the clutch.

8. The system of claim 1, wherein the clutch is integral with the flexible drive shaft.

9. The system of claim 1, wherein the clutch comprises an actuator that in operation selectively engages and disengages the clutch based on an input signal from an electrical conductor.

10. The system of claim 1, wherein the toolless fastener supports the housing of the clutch on the housing of the downstream component while the housing of the clutch is coupled to the housing of the downstream component.

11. A seed meter drive system, comprising:
   a flexible drive shaft;
   a clutch comprising a toolless fastener that in operation selectively couples a housing of the clutch to a housing of a downstream component, wherein the clutch in operation receives a rotational input from the flexible drive shaft, and the clutch in operation drives a rotatable element of the downstream component in rotation while the housing of the clutch is coupled to the housing of the downstream component and the clutch is engaged; and
   an electrical conductor that in operation engages the clutch upstream of the toolless fastener, wherein the electrical conductor in operation conveys a signal to the clutch that instructs the clutch to engage or disengage;
   whereby the clutch and the electrical conductor are removable from the downstream component by only uncoupling the toolless fastener.

12. The system of claim 11, comprising a tool-actuated fastener that in operation couples the clutch to the flexible drive shaft, wherein the tool-actuated fastener comprises a first opening that facilitates passage of a drive shaft end into the housing of the clutch, and a second opening that facilitates passage of the electrical conductor into the housing of the clutch.

* * * * *